US011670918B2

(12) United States Patent
Nolen et al.

(10) Patent No.: US 11,670,918 B2
(45) Date of Patent: *Jun. 6, 2023

(54) FOLDABLE AND/OR COLLAPSIBLE PLASTIC/COMPOSITE UTILITY ENCLOSURE

(71) Applicant: AFL Telecommunications LLC, Duncan, SC (US)

(72) Inventors: Dustin Kyle Nolen, Mount Olive, AL (US); Selvum Pillay, Hoover, AL (US); Raymond George Thompson, Hoover, AL (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,805

(22) Filed: Jun. 3, 2022

(65) Prior Publication Data

US 2022/0294193 A1     Sep. 15, 2022

Related U.S. Application Data

(63) Continuation of application No. 17/322,120, filed on May 17, 2021, now Pat. No. 11,374,386, which is a
(Continued)

(51) Int. Cl.
*H02B 1/46*     (2006.01)
*H02G 3/08*     (2006.01)
*B65D 6/18*     (2006.01)

(52) U.S. Cl.
CPC ........... *H02B 1/46* (2013.01); *B65D 11/1846* (2013.01); *H02G 3/081* (2013.01); *H02G 3/086* (2013.01)

(58) Field of Classification Search
CPC ........ H02B 1/46; H02B 1/26; B65D 11/1846; B65D 43/0202; B65D 11/18;
(Continued)

(56) References Cited

U.S. PATENT DOCUMENTS 533,750 A     2/1895   Ross
941,014 A    11/1909   Doble
(Continued)

FOREIGN PATENT DOCUMENTS

CA    2345843 C    10/2002
CN    2777053 Y     5/2006
(Continued)

OTHER PUBLICATIONS

International Search Report Corresponding to Application No. PCT/US2022/022307 dated Jun. 24, 2022 (1 page).
(Continued)

*Primary Examiner* — Don M Anderson
(74) *Attorney, Agent, or Firm* — Dority & Manning, P.A.

(57) ABSTRACT

A foldable extension enclosure for a utility enclosure, each having first, second, third, and fourth sides connected by hinges and each folding only in one direction by means of detents on the sides. A first end of the first side slidably overlaps a second opposite end of the third side and a first end of the second side slidably overlaps a second opposite end of the fourth side. There is an internal top ledge on each side in an interior near a top end of the extension enclosure and the utility enclosure and an external bottom ledge on each side on an exterior near a bottom end of the extension enclosure, to mount the extension enclosure to the utility enclosure with concave and convex detents. Convex detents are at the top end of the utility and extension enclosures and concave detents are at the bottom end of the extension
(Continued)

enclosure. The convex detents also reversibly lock a lid to the tops of the utility and extension enclosures.

19 Claims, 13 Drawing Sheets

Related U.S. Application Data continuation of application No. 17/215,651, filed on Mar. 29, 2021, now Pat. No. 11,066,802, which is a continuation-in-part of application No. 16/663,391, filed on Oct. 25, 2019, now Pat. No. 11,008,134.

(60) Provisional application No. 62/751,278, filed on Oct. 26, 2018.

(58) Field of Classification Search
CPC ........ B65D 11/1866; B65D 7/26; B65D 7/28; B65D 9/18; B65D 9/14; B65D 9/12; H02G 3/081; H02G 9/10; H02G 3/086; G01F 15/14; E03B 7/095
See application file for complete search history.

(56) References Cited

U.S. PATENT DOCUMENTS

| | | | |
|---|---|---|---|
| 1,279,083 A | 9/1918 | Thweatt | |
| 1,441,343 A | 1/1923 | Hartshorn | |
| 2,555,754 A | 6/1951 | Morin | |
| 2,941,710 A | 6/1960 | Smith | |
| 3,000,049 A | 9/1961 | Terry, Jr. | |
| 3,107,023 A * | 10/1963 | Jacobson | B65D 9/18 217/15 |
| 3,164,281 A * | 1/1965 | Williams, Jr. | B65D 9/18 217/14 |
| 3,300,166 A * | 1/1967 | Wojciechowski | B65D 5/4283 229/120.32 |
| 3,321,565 A | 5/1967 | Peterson | |
| 3,631,584 A | 1/1972 | Walkup | |
| 3,878,795 A * | 4/1975 | Janda | B65D 19/14 217/43 A |
| 3,968,601 A | 7/1976 | Brown | |
| D245,102 S | 7/1977 | Gross | |
| 4,163,503 A | 8/1979 | McKinnon | |
| 4,265,365 A | 5/1981 | Boteler | |
| 4,266,670 A | 5/1981 | Mykleby | |
| 4,491,231 A | 1/1985 | Heggeland | |
| 4,579,709 A | 4/1986 | Ferreri | |
| 4,809,402 A | 3/1989 | Rainville | |
| 4,820,383 A * | 4/1989 | Shchamorov | B65D 11/1846 220/6 |
| 4,863,059 A | 9/1989 | Christensen | |
| 5,288,453 A | 2/1994 | Rutenbeck | |
| 5,462,383 A * | 10/1995 | Van 'T Veer | H02G 9/04 404/4 |
| 6,138,851 A | 10/2000 | Townson | |
| 6,261,499 B1 | 7/2001 | Okeke | |
| 6,269,966 B1 | 8/2001 | Pallo | |
| 6,325,962 B1 | 12/2001 | Kmiecik | |
| D478,672 S | 8/2003 | Charlebois | |
| 6,669,044 B2 | 12/2003 | Murakami | |
| 6,749,080 B1 | 6/2004 | White | |
| 6,861,584 B2 | 3/2005 | Hutchin | |
| 7,030,315 B1 | 4/2006 | Dunn | |
| 7,115,311 B2 | 10/2006 | Arthurs | |
| 7,163,352 B2 | 1/2007 | Jurich | |
| 7,234,275 B1 | 6/2007 | Haggy | |
| 7,320,768 B2 | 1/2008 | Eimura | |
| 7,381,888 B2 | 6/2008 | Burke | |
| 7,385,137 B2 | 6/2008 | Burke | |
| 7,406,240 B2 | 7/2008 | Murano | |
| 7,501,573 B2 | 1/2009 | Balfour, Jr. | |
| 7,513,385 B2 | 4/2009 | Flynn | |
| 7,633,742 B2 | 12/2009 | Standish | |
| 7,802,402 B2 | 9/2010 | Skaggs | |
| 7,807,923 B2 | 10/2010 | Moran | |
| 7,880,641 B2 | 2/2011 | Parris | |
| 7,959,846 B2 | 6/2011 | White | |
| 8,096,439 B2 | 1/2012 | Fogerlie | |
| 8,249,411 B2 | 8/2012 | Burke | |
| 8,261,410 B2 | 9/2012 | Sze | |
| 8,302,796 B1 | 11/2012 | Johnson | |
| 8,307,604 B2 | 11/2012 | Stepanian | |
| 8,336,847 B2 | 12/2012 | Abate | |
| 8,534,484 B2 | 9/2013 | Rost | |
| 8,561,641 B2 | 10/2013 | Ogden | |
| D693,908 S | 11/2013 | Rost | |
| D693,909 S | 11/2013 | Rost | |
| 8,686,909 B2 | 4/2014 | Frank | |
| 8,847,070 B2 | 7/2014 | Burke | |
| 8,796,548 B2 | 8/2014 | Rost | |
| 9,265,162 B2 | 2/2016 | Kang | |
| 9,287,693 B2 | 3/2016 | Burke | |
| 9,553,433 B2 | 1/2017 | Lalancette | |
| 9,768,592 B2 | 2/2017 | Unger | |
| 9,809,960 B2 | 11/2017 | Wiley | |
| 9,876,340 B2 | 1/2018 | Unger | |
| 9,917,427 B2 | 3/2018 | Rost | |
| 10,132,052 B2 | 11/2018 | Dang | |
| 10,136,530 B2 | 11/2018 | Dang | |
| D841,279 S | 2/2019 | Freeman | |
| 10,232,978 B2 | 3/2019 | Chinni Vergottini | |
| 10,256,616 B1 | 4/2019 | Schweinberg | |
| 10,305,268 B2 | 5/2019 | Unger | |
| 10,428,487 B2 | 10/2019 | Cassidy | |
| 10,479,563 B2 | 11/2019 | Tramm | |
| 10,547,168 B2 | 1/2020 | Tipton | |
| 10,804,644 B2 | 4/2020 | Cretella | |
| 10,656,363 B2 | 5/2020 | Elford | |
| 10,840,682 B2 | 11/2020 | Tipton | |
| 11,008,134 B2 * | 5/2021 | Nolen | B65D 11/1846 |
| 11,008,728 B2 | 5/2021 | Turner | |
| 11,014,705 B2 | 5/2021 | Strange | |
| 11,040,800 B2 | 6/2021 | Mcdade | |
| 11,046,480 B2 | 6/2021 | Mccrea | |
| 11,050,229 B2 | 6/2021 | Baker | |
| 11,059,666 B2 | 7/2021 | Lanigan | |
| 11,066,802 B1 * | 7/2021 | Nolen | H02G 3/086 |
| 11,072,904 B2 | 7/2021 | Chudley | |
| D941,582 S * | 1/2022 | Nolen | D3/305 |
| 11,338,524 B1 * | 5/2022 | Nolen | B29C 65/565 |
| 11,374,386 B2 * | 6/2022 | Nolen | H02B 1/46 |
| 2003/0102309 A1 | 6/2003 | Hartwall | |
| 2007/0158345 A1 | 7/2007 | Booth | |
| 2008/0134466 A1 | 6/2008 | Massengill | |
| 2008/0190950 A1 * | 8/2008 | Orr | B65D 43/0202 220/780 |
| 2009/0266813 A1 * | 10/2009 | Afflerbach | B65D 11/1873 220/4.01 |
| 2010/0055389 A1 | 3/2010 | Allore | |
| 2010/0175904 A1 | 7/2010 | Hebert | |
| 2010/0326001 A1 | 12/2010 | Herron | |
| 2012/0228302 A1 | 9/2012 | Byrns | |
| 2016/0297607 A1 * | 10/2016 | Burke | B32B 5/02 |
| 2018/0100284 A1 | 4/2018 | Isaacson | |
| 2019/0345740 A1 | 11/2019 | Fisher | |
| 2020/0018102 A1 | 1/2020 | Lindberg | |
| 2020/0122886 A1 | 4/2020 | Barlier | |
| 2020/0338795 A1 | 10/2020 | Mcculley | |
| 2020/0386023 A1 | 12/2020 | Larson | |
| 2021/0016921 A1 * | 1/2021 | Nolen | H02B 1/26 |
| 2021/0086979 A1 | 3/2021 | Guerdrum | |
| 2021/0171237 A1 | 6/2021 | Hsu | |
| 2022/0145612 A1 * | 5/2022 | Nolen | B29C 65/565 |
| 2022/0149601 A1 * | 5/2022 | Nolen | H02G 3/081 |
| 2022/0173579 A1 * | 6/2022 | Nolen | H02G 3/086 |
| 2022/0294193 A1 * | 9/2022 | Nolen | B65D 11/1846 |

FOREIGN PATENT DOCUMENTS

| | | |
|---|---|---|
| DE | 102005016491 B4 | 10/2006 |
| DE | 102005037997 A1 | 2/2007 |
| DE | 202020000904 U1 | 6/2021 |

(56) References Cited

FOREIGN PATENT DOCUMENTS

| | | |
|---|---|---|
| EM | D210289 | 8/2020 |
| EP | 1098319 A1 | 5/2001 |
| EP | 1515409 B1 | 3/2005 |
| EP | 1461259 B1 | 8/2006 |
| EP | 2166392 B1 | 3/2010 |
| EP | 2166393 B1 | 3/2010 |
| EP | 2177668 A2 | 4/2010 |
| EP | 2357284 B1 | 8/2011 |
| EP | 2604758 B1 | 6/2013 |
| EP | 2607938 B1 | 6/2013 |
| EP | 2631370 B1 | 8/2013 |
| EP | 2738584 B1 | 6/2014 |
| EP | 2878734 B1 | 6/2015 |
| EP | 3029218 B1 | 6/2016 |
| EP | 3300196 B1 | 3/2018 |
| EP | 3483343 A1 | 5/2019 |
| EP | 3518634 A1 | 7/2019 |
| EP | 3536860 A1 | 9/2019 |
| EP | 3567688 A1 | 11/2019 |
| ES | 2668350 T3 | 5/2018 |
| FR | 2933993 B1 | 1/2010 |
| GB | 2324324 B | 10/1998 |
| GB | 2394968 B | 5/2004 |
| GB | 2404409 B | 2/2005 |
| GB | 2436341 B | 9/2007 |
| GB | 2450930 B | 1/2009 |
| GB | 2520784 A | 6/2015 |
| GB | 2576181 A | 2/2020 |
| GB | 2576444 A | 2/2020 |
| KR | 20180087548 A | 8/2018 |
| WO | WO2014147477 A1 | 9/2014 |
| WO | WO2015107355 A2 | 7/2015 |
| WO | WO2016022481 A1 | 2/2016 |
| WO | WO2016168497 A1 | 10/2016 |
| WO | WO2020011334 A1 | 1/2020 |
| WO | WO2020072736 A1 | 4/2020 |
| WO | WO2021042950 A1 | 3/2021 |
| WO | WO2021107628 A1 | 6/2021 |

OTHER PUBLICATIONS

International Search Report Correspoding to Application No. PCT/US2022/023808 dated Jul. 11, 2022 (1 page).

International Search Report Corresponding to Application No. PCT/US2022/023446 dated Jul. 26, 2022 (1 page).

* cited by examiner

FOLDABLE AND/OR COLLAPSIBLE PLASTIC/COMPOSITE UTILITY ENCLOSURE

Cross-Reference to Related Application

The present application is a continuation of U.S. patent application Ser. No. 17/322,120, filed on May 17, 2021, which is a continuation in part of U.S. patent application Ser. No. 17/215,651, filed on Mar. 29, 2021 (U.S. Pat. No. 11,066,802, issued on Jul. 20, 2021), which is a continuation in part of U.S. patent application Ser. No. 16/663,391, filed on Oct. 25, 2019 (U.S. Pat. No. 11,008,134, issued on May 18, 2021), which claims the benefit of priority to U.S. Provisional Patent Application No. 62/751,278, filed on Oct. 26, 2018, the disclosures of all of which are incorporated by reference herein in their entireties.

FIELD OF THE INVENTION

The invention relates to utility underground utility enclosures for providing protection for below ground devices such as water meters, valves, telecom hardware, and the like and, more particularly, to a foldable and/or collapsible plastic/composite utility enclosure.

BACKGROUND OF THE INVENTION

Utility enclosures are used to protect buried meters, valves, and telecom hardware and need to be capable of withstanding heavy loads that may be placed on the cover of the utility enclosure. Concrete utility enclosures are commonly used in or near roadways and driveways since they are heavy duty and are capable of withstanding heavy loads placed on the cover. Concrete utility enclosures are formed by a wall of concrete that extends around the utility. A lip extends about the top of the utility enclosure in the interior of the utility enclosure. The cover of the utility enclosure fits into the interior of the utility enclosure and rests on the lip. The concrete lip provides sufficient support to the cover to enable the utility enclosure to withstand the force of heavy loads.

Concrete utility enclosures present some disadvantages, however. Concrete utility enclosures are difficult to transport and install. They are bulky and take up space. During transport, concrete utility enclosures are prone to being chipped, and significant amounts of concrete utility enclosures become non-usable because of damage incurred in transport. Installation of concrete utility enclosures is difficult because of the weight of the utility enclosures. Installation of a concrete utility enclosure generally requires the effort of two people because the utility enclosures weigh in excess of two hundred pounds each. The weight of the concrete utility enclosures also presents some danger of physical injury to the persons installing the utility enclosure.

Plastic utility enclosures are known. U.S. Pat. No. 5,333,750 discloses a plastic utility enclosure that is durable, lightweight, and capable of being located in roadways or driveways and withstanding heavy loads. However, plastic utility enclosures also are bulky and take up space during transportation. What is needed is a foldable utility enclosure that takes up reduced space when folded.

SUMMARY OF THE INVENTION

This invention is a foldable plastic/composite utility enclosure having a first side, a second side opposite the first side, a third side, and a fourth side opposite the third side. Each of the sides has a first end and a second opposite end. The first end of the first side is connected to the first end of the third side by means of a first hinge. The second opposite end of the second side is connected to the second opposite end of the third side by means of a second hinge. The second opposite end of the first side is connected to the second opposite end of the fourth side by means of a third hinge. The first end of the second side is connected to the first end of the fourth side by means of a fourth hinge.

The third side is constructed to rotate on the first and second hinges only away from the first side. The fourth side is constructed to rotate on the third and fourth hinges only towards the first side. The third side and the fourth side are constructed to rotate until the first side engages the second side and the foldable plastic/composite utility enclosure is in a folded configuration. The folded plastic/composite utility enclosure when in a folded configuration has only 15 to 20 percent of the thickness compared to an unfolded configuration.

The first end of the first side and the first end of the second side are curved. The first end of the third side is positioned slideably over the first end of the first side and the first end of the fourth side is positioned slideably over the first end of the second side. The second opposite end of the first side abuts against the second opposite end of the fourth side and the second opposite end of the third side abuts against the second opposite end of the second side. The second opposite ends are angled.

Each hinge consists of hinge members wherein each hinge member is positioned in a housing. The housing has an open interior to help anchor the housing in the ground. Each edge of each side has a plurality of spaced-apart hinge members wherein hinge members on one side engage the hinge members on another side to form the hinge. One or more of the hinges may have a reversibly insertable locking pin that prevents the sides from rotating on the hinges and prevents the foldable plastic/composite utility enclosure from folding.

A detent is located on an extension of the first end of the third side, on the first end of the first side, on an extension of the first end of the fourth side, and on the first end of the second side, wherein the detents reversibly maintain the foldable utility enclosure in an open configuration. A plurality of convex detents is located near the top of the sides in an interior of the foldable utility enclosure, wherein the convex detents are constructed to reversibly retain an extension enclosure having concave detents or to reversibly retain a lid having tapered sides.

The foldable and/or collapsible plastic/composite utility enclosure of this invention can be made of any type of plastic or composite, preferably plastic imbedded with fibers such as carbon fibers, glass fibers, or ceramic fibers or imbedded with particles such as glass particles. The use of plastic/composite and various openings or cutouts makes the utility enclosure light weight. The hinges allow the utility enclosure to be folded flat for storage and transportation. The pairs of sides are symmetrical which facilitates manufacturing. The foldable plastic/composite utility enclosure is ideal for housing underground utilities. However, it can be used to house or contain any desired device.

An extension enclosure is provided to increase the length from top to bottom of the utility enclosure. The extension enclosure is constructed similar to the utility enclosure. The extension enclosure can have any desirable length from top to bottom and the length of the utility enclosure from top to bottom can be increased with as many extension enclosures attached to each other as desired. The extension enclosure has an internal top ledge formed on each side of the extension enclosure in the interior near the top end of the extension enclosure to support another extension enclosure and/or to support a cover. An external bottom ledge is formed on each side of the extension enclosure near the bottom end of the exterior of the extension enclosure. A plurality of convex detents is located in the sides between the internal top ledge and the top end, and a plurality of concave detents is located in the sides between the external bottom ledge and the bottom end.

To attach an extension enclosure to a utility enclosure, the bottom end of the extension enclosure is positioned into an interior of the utility enclosure at the top end of the utility enclosure. The bottom end of the extension enclosure engages the ledges of the utility enclosure while the external ledge of the extension enclosure engages the top end of the utility enclosure. In this configuration the convex detents near the top end of the utility enclosure are in alignment with the concave detents at the bottom end of the extension enclosure. The concave detents are forced over the convex detents to reversibly lock the extension enclosure to the utility enclosure. In a like manner, a second extension enclosure can be attached to the first extension enclosure to further increase the length of the utility enclosure. The extension enclosure also has detents to reversibly maintain the foldable extension enclosure in an open configuration.

BRIEF DESCRIPTION OF THE DRAWINGS

FIG. 25 shows a top, side view of the extension enclosure shown in FIG. 16 in an open position.

FIG. 26 shows an enlarged view of the first end of the fourth side and the first end of the second side of the utility enclosure of FIG. 25.

DETAILED DESCRIPTION OF THE INVENTION

While the following description details the preferred embodiments of the present invention, it is to be understood that the invention is not limited in its application to the details of arrangement of the parts or the illustrations disclosed herein, since the invention is capable of other embodiments and of being practiced in various ways.

Figure 1:
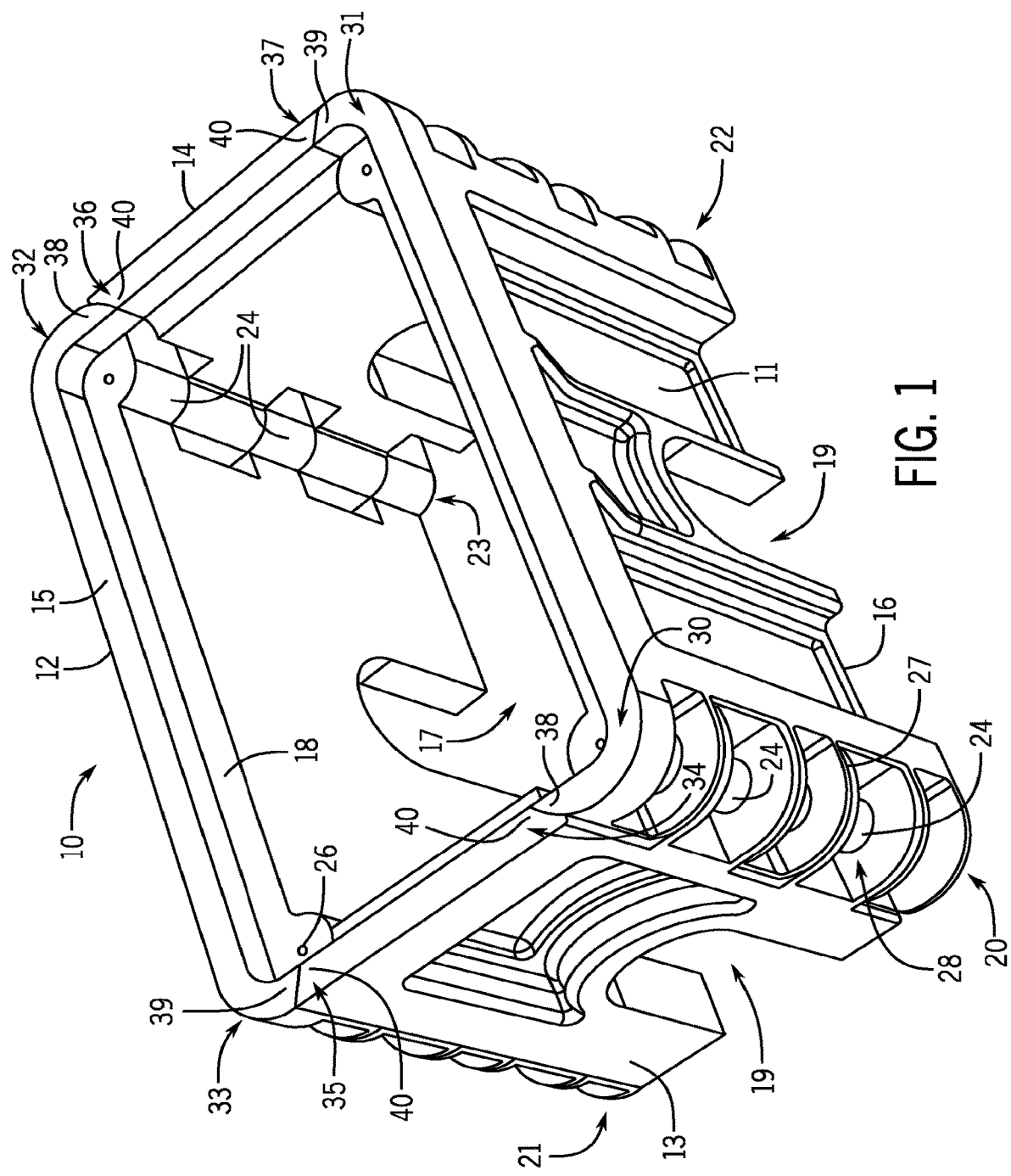
FIG. 1 is a top, front, perspective view of the utility enclosure of the present invention.

FIG. 1 is a top, front, perspective view of the utility enclosure 10 of the present invention. The utility enclosure 10 is rectangular and has a first side 11, a second side 12 opposite the first side 11, a third side 13, and a fourth side 14 opposite the third side 13. The first side 11 and the second side 12 form a first pair of sides and the third side 13 and the second side 14 form a second pair of sides. The utility enclosure 10 has a top end 15, a bottom end 16, and an interior 17. An interior ledge 18 is formed on each side in the interior 17 near the top end 15 to support a cover (see FIGS. 11 and 12) or an extension enclosure 80 (See FIG. 16). The edges of each side 11, 12, 13, and 14 are joined together with hinges 20, 21, 22, and 23 to form the rectangular utility enclosure 10, with a hinge in each corner of the rectangle. The hinges 20, 21, 22, and 23 are made up of hinge members 24. Each hinge member 24 has a central hole 25 (see FIGS. 2A and 2B) for the insertion of a hinge pin 26 to form the hinge, as is known in the art. The hinge members 24 are formed in open hollow housings 27, the housings 27 having interiors 28.

First side 11 has a first end 30 and a second opposite end 31. The second side 12 has a first end 32 and a second opposite end 33. The third side 13 has a first end 34 and a second opposite end 35. The fourth side 14 has a first end 36 and a second opposite end 37. The first ends 30 and 32 of the sides 11 and 12 (first pair of sides) form curved corners which end with curved extensions 38. The second opposite ends 31 and 33 of sides 11 and 12 are also curved and form acute angles 39. The first ends 34 and 36 of sides 13 and 14 (second pair of sides) and the second opposite ends 35 and 37 of sides 13 and 14 form obtuse angles 40. The first ends 34 and 36 of the sides 13 and 14 fit over the curved extensions 38 of sides 11 and 12 and the first ends 34 and 36 may be slightly curved to match the curved extensions 38. The second opposite end 35 of the third side 13 forms an obtuse angle 40 between an interior surface 45 (see FIG. 3B) of the third side 13 and an interior surface 42 (see FIG. 2B) of the first side 11. The obtuse angle 40 extends from the top end 15 of the utility enclosure 10 to the bottom end 16 of the utility enclosure 10. The second opposite end 37 of the fourth side 14 forms an acute angle 39 between an interior surface 45A of the fourth side 14 and an interior surface 42 of the first side 11 and the acute angle 39 extends from the top end 15 of the utility enclosure 10 to the bottom end 16 of the utility enclosure 10. The angled edges of the second opposite ends 35 and 37 of sides 13 and 14 abut the angled edges of the ends 31 and 33 of the sides 11 and 12. The sides 11, 12, 13, and 14 may have openings 19 to accommodate wires, pipes, tubing, and the like.

Figure 2A:
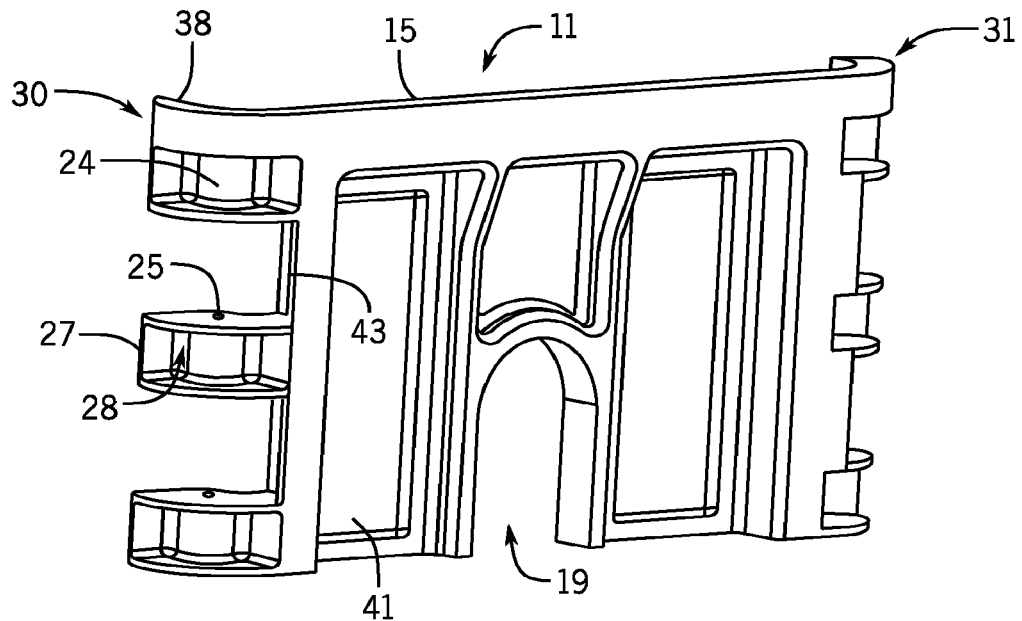
FIG. 2A is perspective view from an exterior surface of a first side the utility enclosure.
Figure 2B:
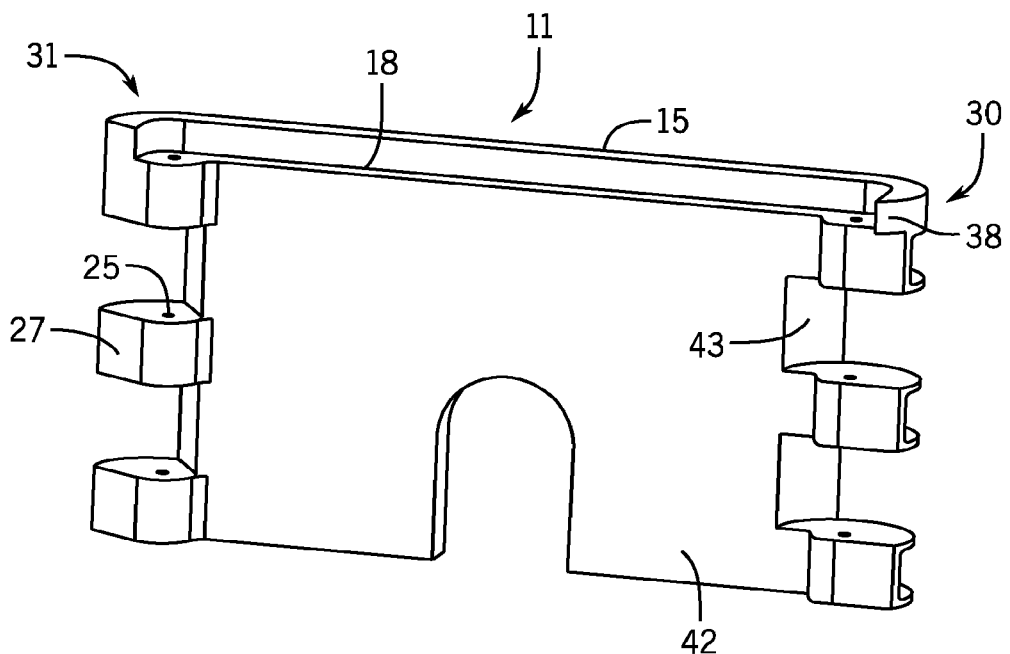
FIG. 2B is a perspective view from an interior surface of the first side.

FIG. 2A is perspective view from an exterior surface 41 of the first side 11, separated from the utility enclosure 10, and FIG. 2B is a perspective view from an interior surface 42 of the first side 11. The hinge members 24, the housings 27, and the interiors 28 can be seen in more detail. Grooves or spaces 43 between the hinge members 24 accommodate the housings 27 of the hinge members 24 that engage the first side 11 to complete the formation of the hinges 23.

Figure 3A:
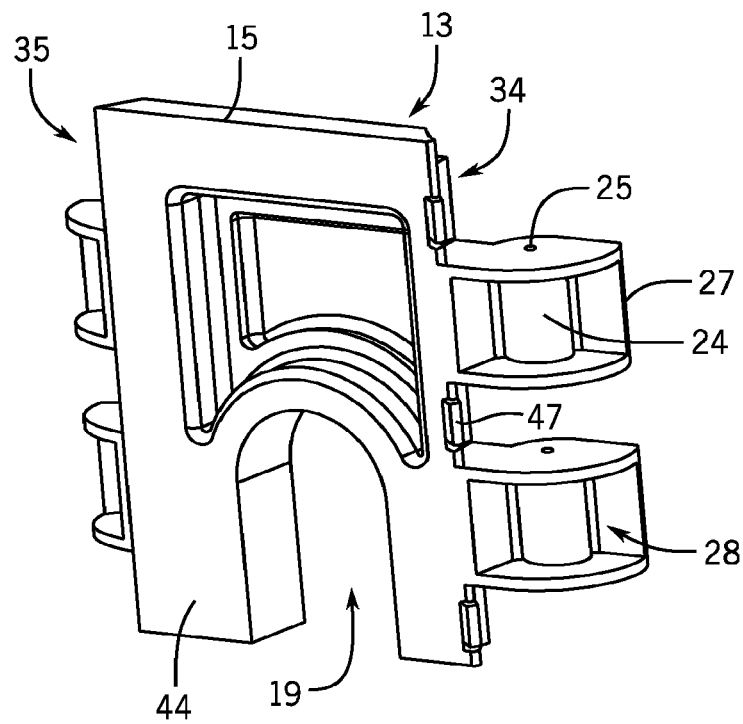
FIG. 3A is perspective view from an exterior surface of a third side.
Figure 3B:
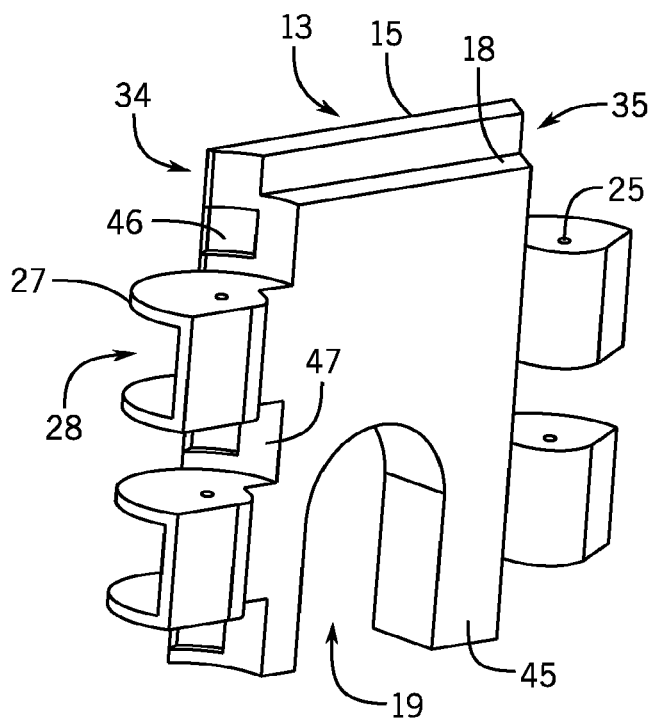
FIG. 3B is a perspective view from an interior surface of the third side.

FIG. 3A is perspective view from an exterior surface 44 of the third side 13 separated from the utility enclosure 10 and FIG. 3B is a perspective view from an interior surface 45. The hinge members 24, the housings 27, and the interiors 28 can be seen in more detail. FIGS. 3A and 3B further show latches 46 which lock the third side 13 to the first side 11 to prevent the utility enclosure 10 from folding. Grooves 47 between the hinge members 24 accommodate the housings 27 of the hinge members 24 that engage the third side 13 to complete the formation of the hinges 20, 21, 22, 23.

The housings 27 strengthen the hinges 20, 21, 22, 23 and protect them from external forces. When the utility enclosure 10 is placed in the ground to protect an underground device, soil, rocks, and cement can fill the interiors 28 of the housings 27 which will prevent the utility enclosure 10 from moving or folding. The first side 11 and the second side 12 are identical to each other and the third side 13 and the fourth side 14 are identical to each other with regard to hinging and folding features.

Figure 4:
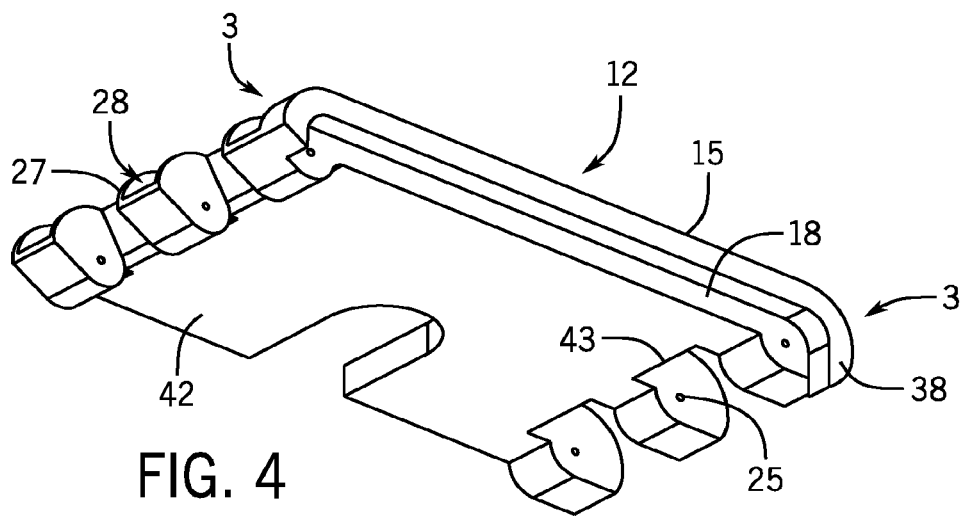
FIG. 4 is a top, interior surface view of the second side of the utility enclosure.
Figure 5:
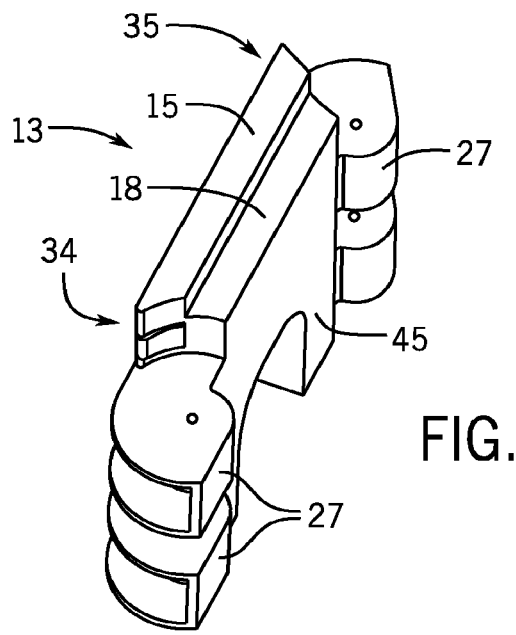
FIG. 5 is a top, interior surface view of the third side of the utility enclosure.
Figure 6:
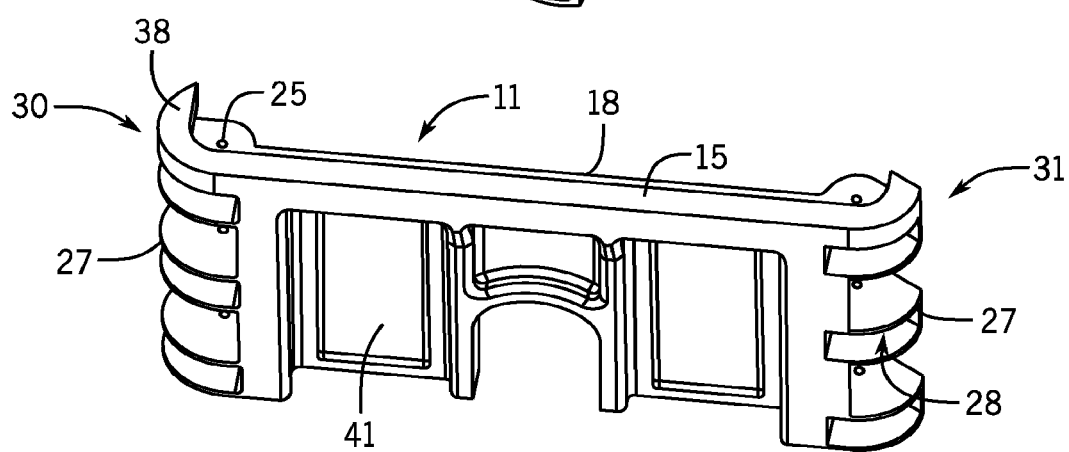
FIG. 6 is a top, exterior surface view of the first side of the utility enclosure.

FIG. 4 is a top, interior surface view of the second side 12. FIG. 5 is a top, interior surface view of the third side 13. FIG. 6 is a top, exterior surface view of the first side 11. The utility enclosure 10 is formed by inserting the housings 27 on end 35 of the third side 13 in between the housings 27 on end 31 of the second side 12 and inserting the housings 27 on end 34 of the third side 13 in between the housings 27 on end 30 of the first side 11. The pins 26 are then inserted through the holes 25 to form the hinges 20, 21, 22, 23. The fourth side 14 is added to sides 11 and 12 in the same way to complete the assembly of the utility enclosure 10.

Figure 7A:
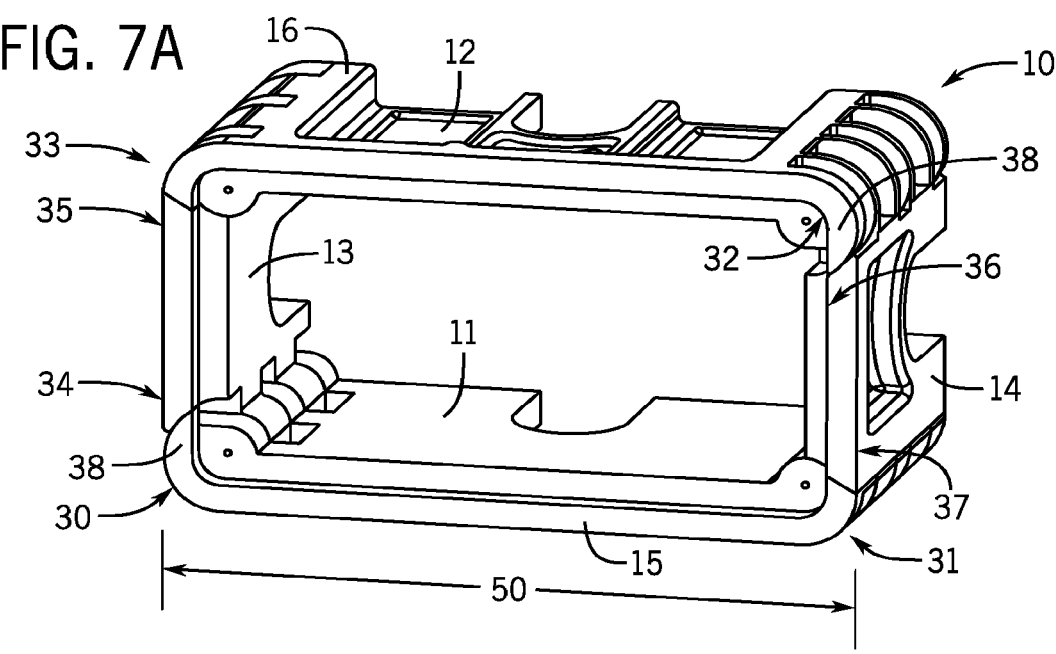
FIG. 7A is a top perspective view of the utility enclosure laying with its first side on a horizontal plane in an unfolded configuration.
Figure 7B:
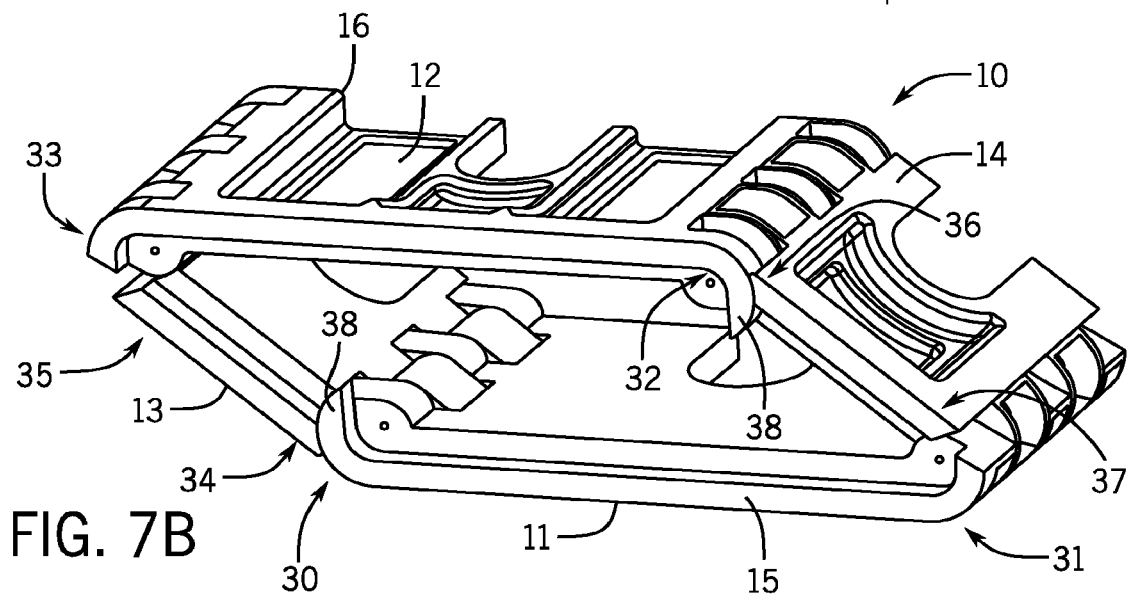
FIG. 7B shows the utility enclosure of FIG. 7A in a semi-folded configuration.
Figure 7C:
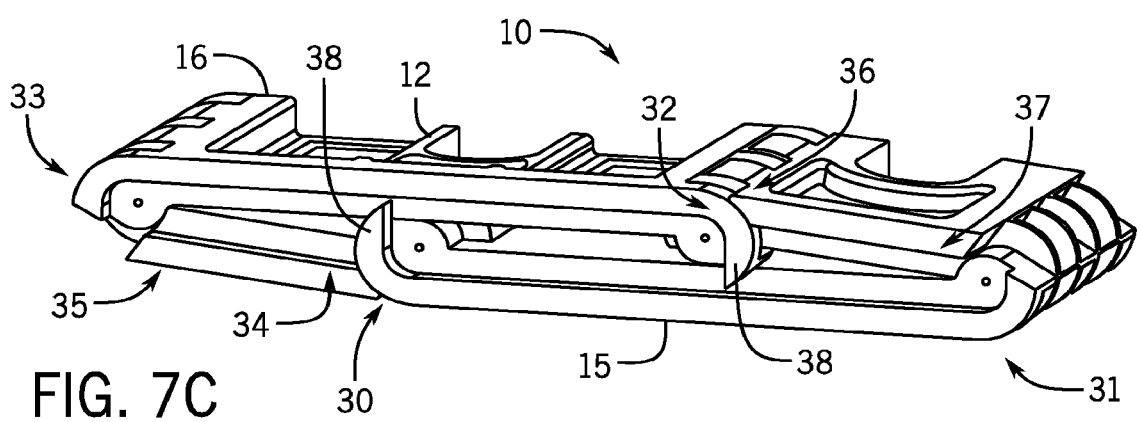
FIG. 7C shows the utility enclosure of FIG. 7A in a completely folded configuration.

FIG. 7A is a top perspective view of the utility enclosure 10 laying with its first side 11 on a horizontal plane, shown by double arrow 50. The utility enclosure 10 is in an unfolded configuration. FIG. 7B shows the utility enclosure 10 in a semi-folded configuration. FIG. 7C shows the utility enclosure 10 in a completely folded configuration. As the second side 13 is rotated away from the first side 11 the fourth side 14 is rotated towards the first side 11. The second side 12 moves inward towards the first side 11. In the folded configuration the utility enclosure 10 has about 15% to 25% of the thickness, compared to the unfolded configuration, preferably about 20%.

Figure 8A:
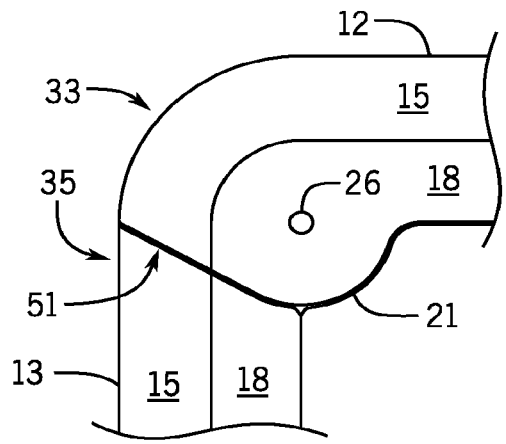
FIG. 8A shows an enlarged top view of an end of a second side and an end of the third side in an unfolded configuration.
Figure 8B:
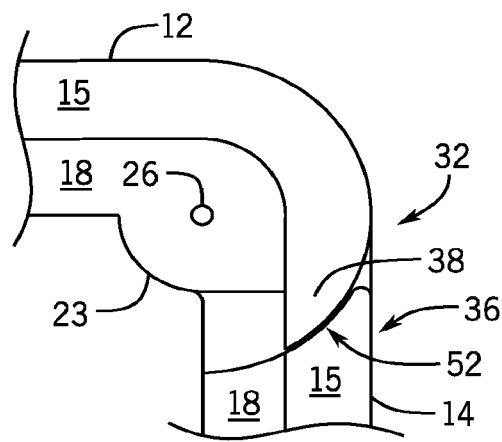
FIG. 8B show an enlarged top view of the end of the second side and an end of a fourth side in an unfolded configuration.

FIG. 8A shows an enlarged top view of the end 33 of the second side 12 and the end 35 of the third side 13 in an unfolded configuration. FIG. 8B shows an enlarged top view of the end 32 of the second side 12 and the end 36 of the fourth side 14 in an unfolded position. The utility enclosure 10 cannot fold in a direction opposite to that shown in FIGS. 9A, 9B, 10A, and 10C because the end 35 of side 13 abuts the end 33 of side 12, shown by arrow 51, at an angle relative to sides 12 and 13. The end 35 of side 13 cannot move around the end 33 of side 12. However, the end 36 of side 14 can move around end 32 of side 12, as shown in FIGS. 9A, 9B, 10A, and 10C, because end 36 overlaps end 32, shown by arrow 52.

Figure 9A:
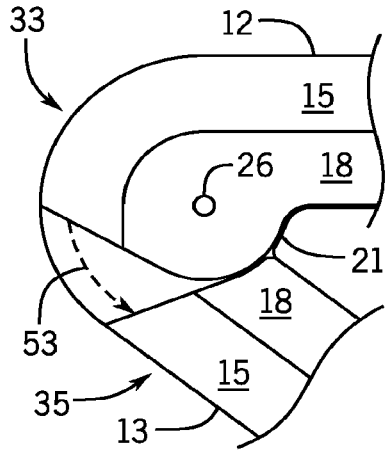
FIGS. 9A and 9B show the same views as 8A and 8B but with the utility utility enclosure in a semi-folded configuration.
Figure 9B:
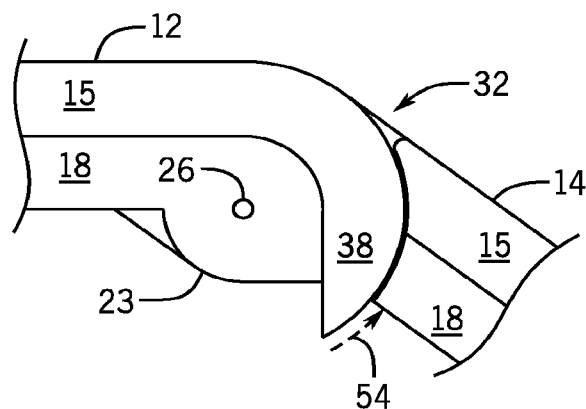
Figure 10A:
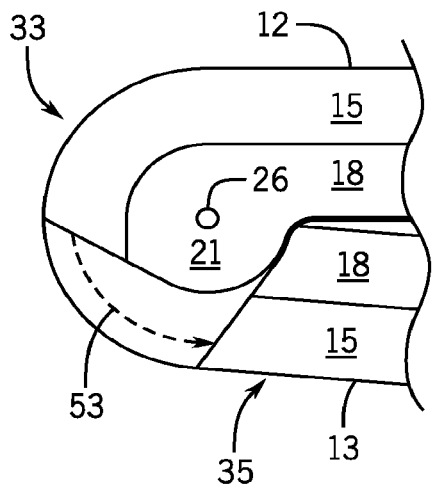
FIGS. 10A and 10B show the same views 8A and 8B but with the utility enclosure in a completely folded configuration.
Figure 10B:
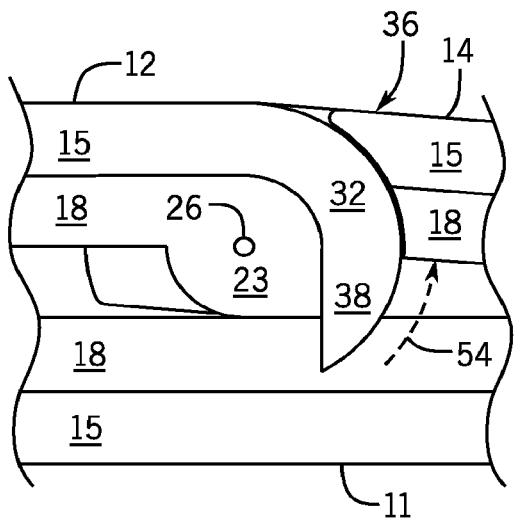

FIGS. 9A and 9B show the same views as FIGS. 8A and 8B but with the utility enclosure 10 in a semi-folded configuration. Arrow 53 in FIG. 9A shows the extent to which end 35 of side 13 has moved away from end 33 of side 12. Arrow 54 in FIG. 9B shows the extent to which end 36 of side 14 has moved over and around the curved extension 38 of end 32 of side 12. FIGS. 10A and 10B show the same views as FIGS. 8A and 8B but with the utility enclosure 10 in a completely folded configuration with the first side 11 engaging the second side 12. The folding of the utility utility enclosure 10 is reversible and the utility enclosure 10 can be restored to its unfolded configuration by pulling the first side 11 and the second side 12 apart.

Figure 11:
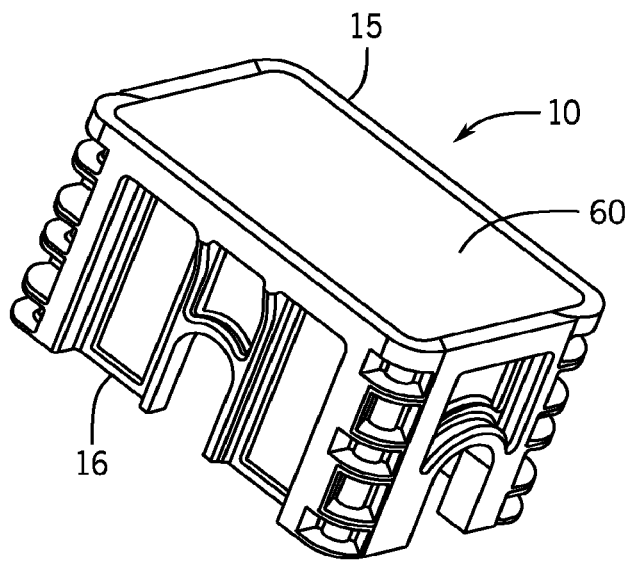
FIG. 11 shows a top perspective view of the utility enclosure with a top cover inserted in a top end of the utility enclosure.
Figure 12:
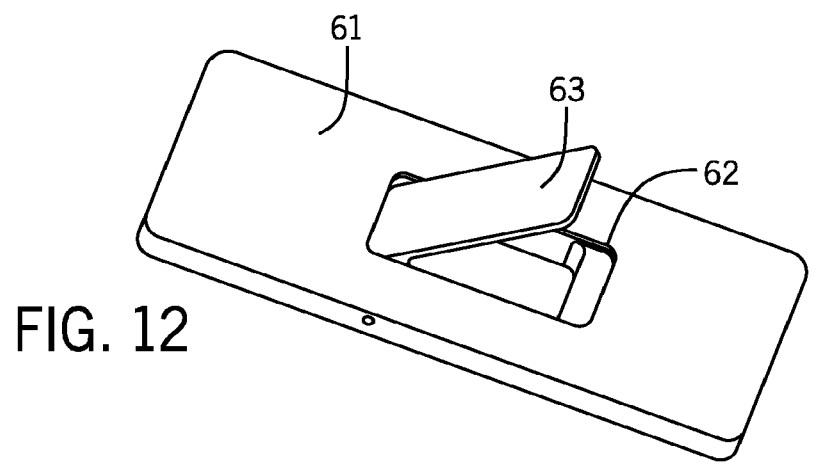
FIG. 12 shows a top perspective view of the top cover having an opening with a door.

FIG. 11 shows a top perspective view of the utility enclosure 10 with a top cover 60 inserted in the top end 15. The top cover 60 can have handles or openings for removing the cover 60. FIG. 12 shows a top perspective view of a top cover 61 having an opening 62 with a door 63. The interior 17 of the utility enclosure 10 can be viewed and accessed by raising the door 63.

Figure 13:
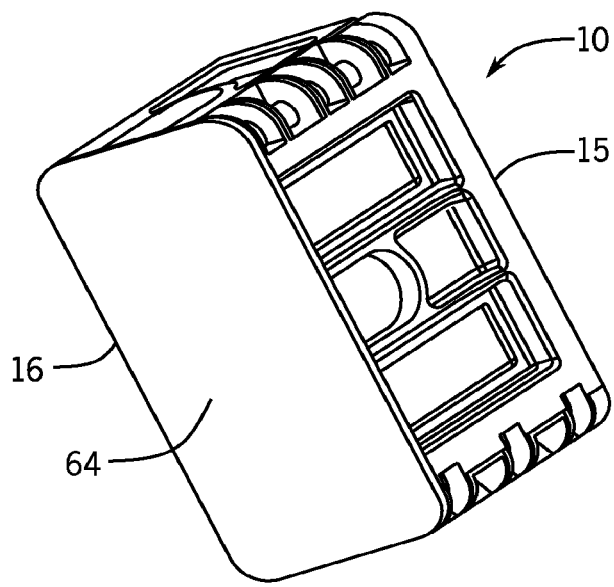
FIG. 13 shows a bottom perspective view of the utility enclosure with a bottom cover attached reversibly to a bottom end of the utility enclosure.

FIG. 13 shows a bottom perspective view of the utility enclosure 10 with a bottom cover 64 attached reversibly to the bottom end 16 by methods known in the art. The use of a bottom cover 64 allows the utility enclosure 10 to be used as any type of utility enclosure for any type of articles.

Figure 14:
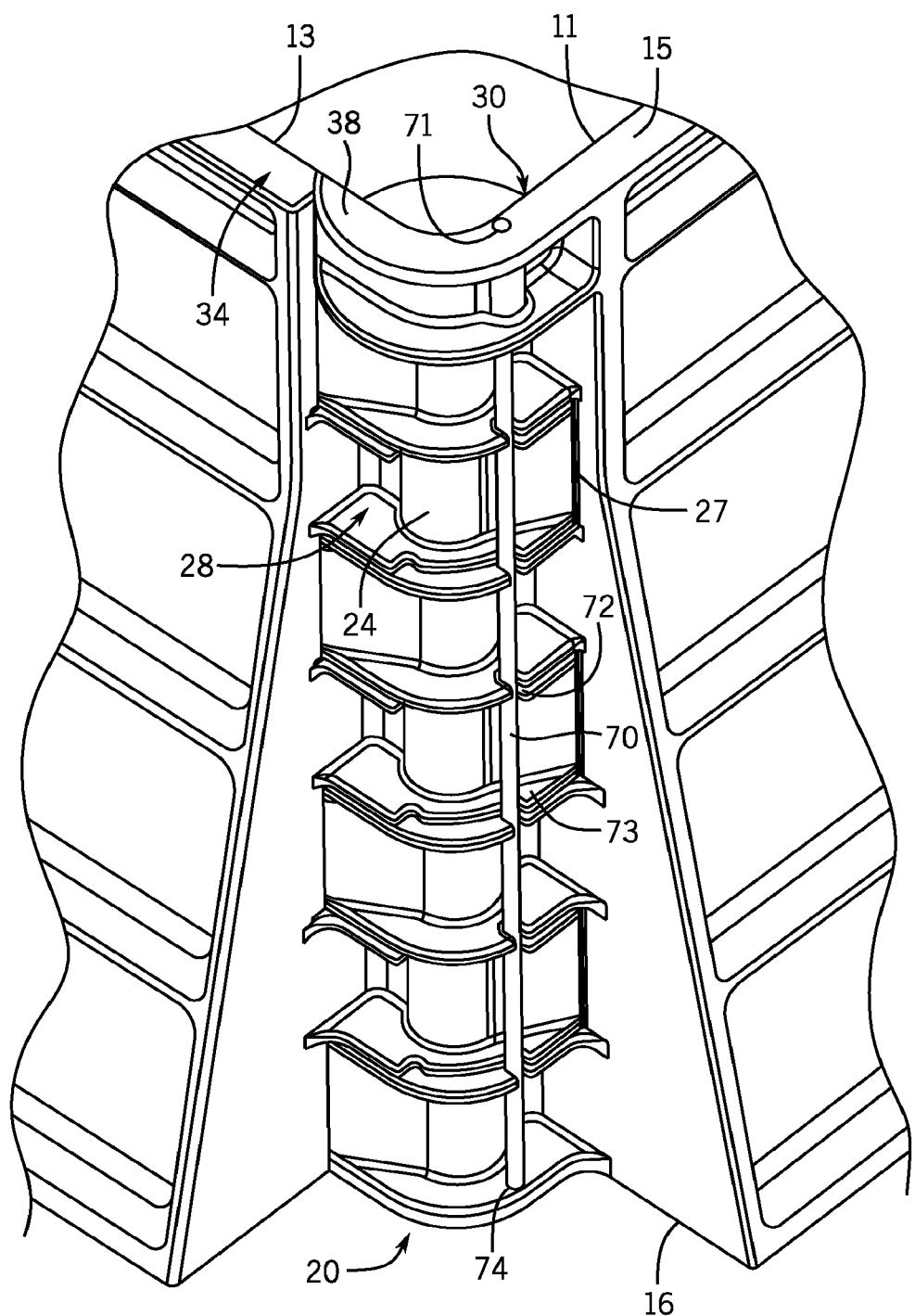
FIG. 14 shows a perspective view of corner with a hinge connecting two sides, with a locking pin inserted through the hinge members to prevent rotation of the sides on the hinge and to prevent folding of the foldable plastic utility enclosure.

FIG. 14 shows a perspective view of corner with a hinge connecting two sides, with a locking pin 70 inserted through the hinge members 24 to prevent rotation of the sides on the hinge and to prevent folding of the foldable plastic/composite utility enclosure. An insertion hole 71 is on the top end 15 to insert the locking pin 70. Each hinge member 24 has an upper groove 72 and a bottom groove 73 through which the locking pin 70 passes. The locking pin 70 can be retained in an opening 74 in the bottom hinge member.

Figure 15:
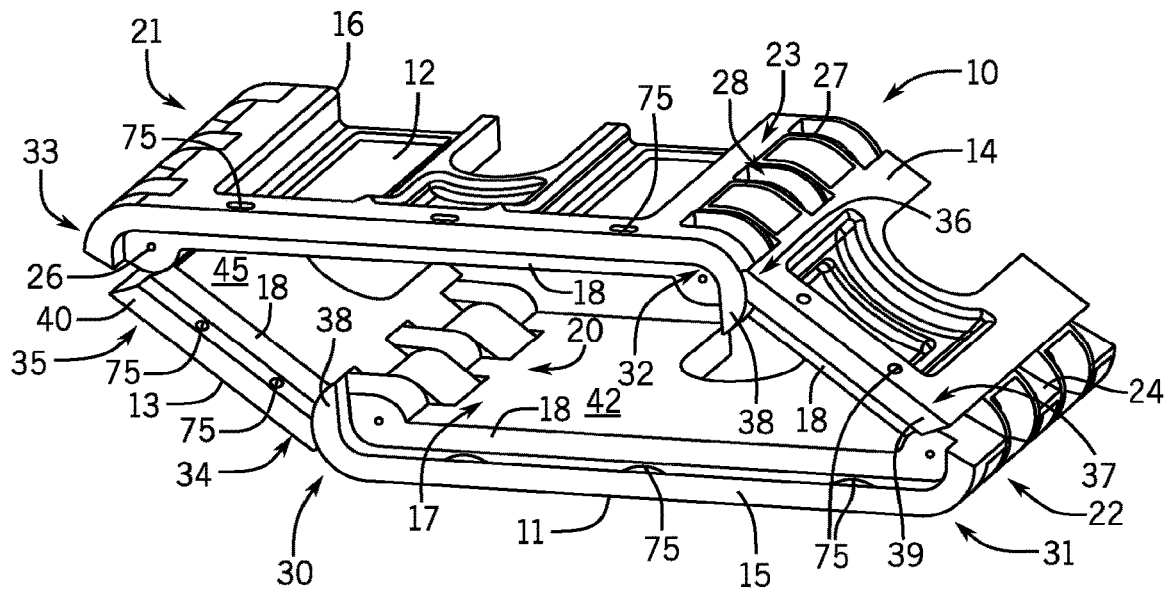
FIG. 15 is a top, side, perspective view of an alternant embodiment of the utility enclosure shown in a partially folded position.

FIG. 15 is a top, side, perspective view of the foldable plastic and/or composite extension enclosure 10 of the present invention in a partially folded position, further showing that the sides 11-14 have a plurality of holes 75 near the top end 15 of the sides and above the interior ledges 18. The holes 75 are for mounting an extension enclosure 80 to the top end 15 of the utility enclosure 10 to increase the length of the utility enclosure 10 from its bottom end to its top end. The length of the extension enclosure 10 can be any desired length, preferably 6 to 24 inches. A plurality of extension enclosures can be mounted to each other and then to a utility enclosure to create a large increase in length of the utility enclosure.

Figure 16:
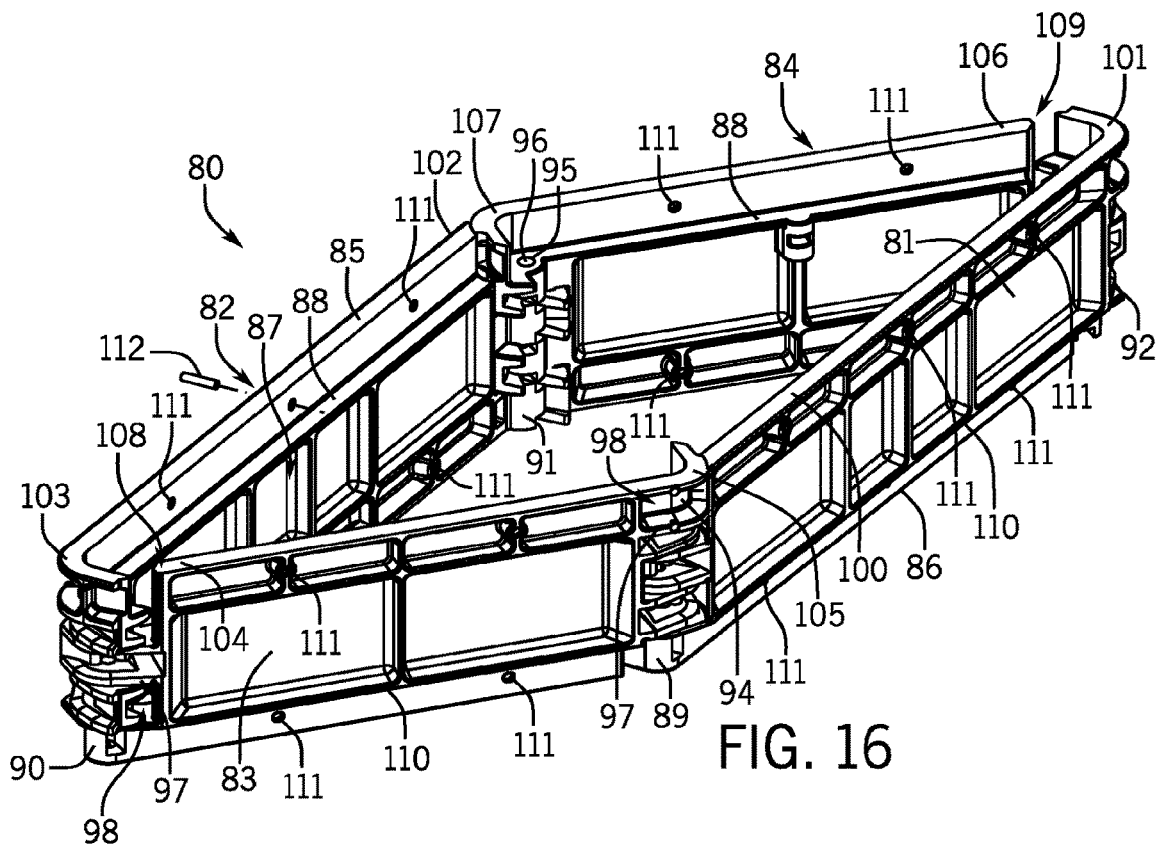
FIG. 16 shows a top, side, perspective view of an extension enclosure in a partially folded position, constructed to extend the length of the utility enclosure when positioned on a top end of the utility enclosure.

FIG. 16 shows a top, side, perspective view of a foldable plastic and/or composite extension enclosure 80 in a partially folded position. The extension enclosure 80 is rectangular and has a first side 81, a second side 82 opposite the first side 81, a third side 83, and a fourth side 84 opposite the third side 83. The first side 81 and the second side 82 form a first pair of sides and the third side 83 and the second side 84 form a second pair of sides. The extension enclosure 80 has a top end 85, a bottom end 86, and an interior 87. An internal top ledge 88 is formed on each side of the extension enclosure 80 in the interior 87 near the top end 85 of the extension enclosure 80 to support another extension enclosure 80 and/or to support a cover 60 (see FIG. 11). The edges of each side 81, 82, 83, and 84 are joined together with hinges 89, 90, 91, and 92 to form a rectangular enclosure, with a hinge in each corner of the rectangle. The hinges 89, 90, 91, and 92 are made up of hinge members 94. Each end of each side has a plurality of spaced-apart hinge members 94. Each hinge member 94 has a central hole 95 for the insertion of a hinge pin 96 to form the hinge, as is known in the art. The hinge members 94 are formed in open hollow housings 97. The housings 97 having interiors 98. An external bottom ledge 110 is formed on each side of the extension enclosure 80 on an exterior near the bottom end 86 of the extension enclosure 80. A plurality of mounting holes 111 is located in the sides between the internal top ledge 88 and the top end 85 and between the external bottom ledge 110 and the bottom end 86.

Figure 17:
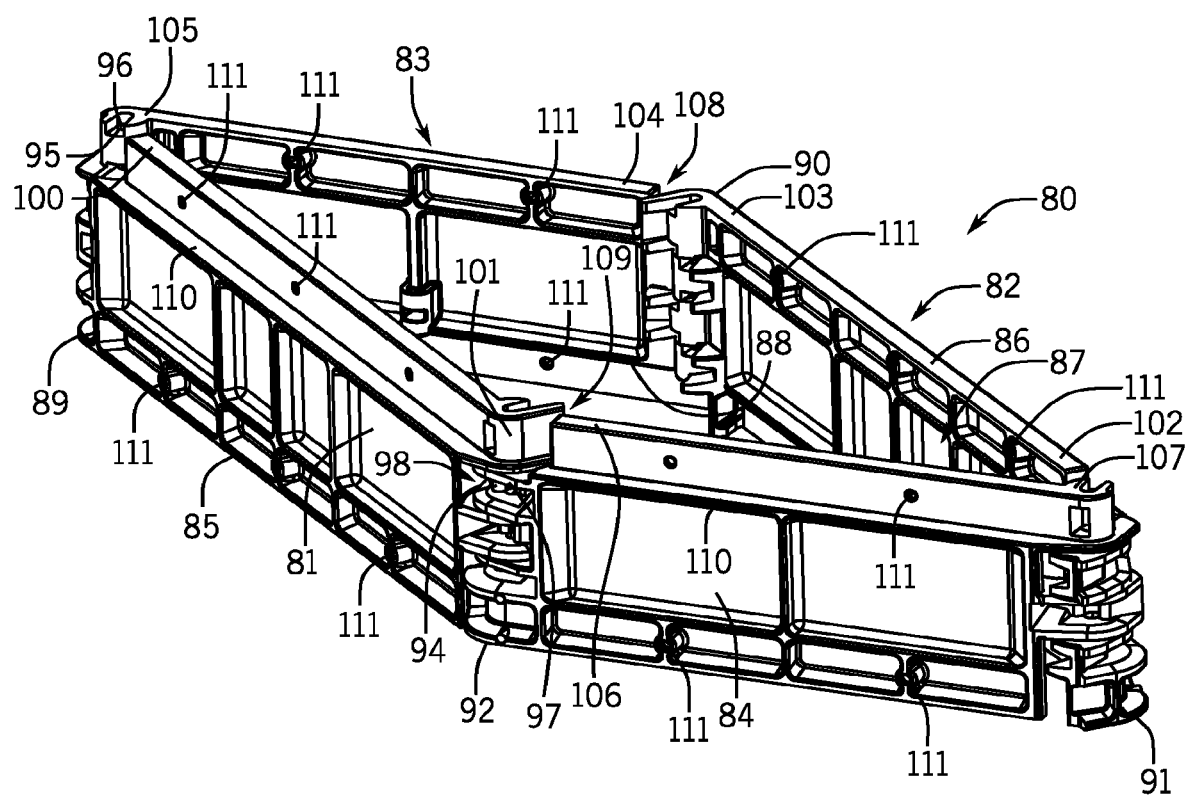
FIG. 17 shows a bottom, side, perspective view of an extension enclosure of FIG. 16.

First side 81 has a first end 100 and a second opposite end 101. The second side 82 has a first end 102 and a second opposite end 103. The third side 83 has a first end 104 and a second opposite end 105. The fourth side 84 has a first end 106 and a second opposite end 107. The second ends 101 and 103 of the sides 81 and 82 (first pair of sides) and the second ends 105 and 107 of sides 83 and 84 (second pair of sides) are curved. The first ends 100 and 102 of sides 81 and 82 form angled edges. The first ends 104 and 106 of sides 83 and 84 form angled edges. The angled edges of first ends 100 and 102 of the sides 81 and 82 fit over the curved ends 105 and 107 of sides 83 and 84. The angled edges of the first ends 104 and 106 of sides 83 and 84 abut the angled edges of the ends 101 and 103 of the sides 81 and 82. The first end 104 of the third side 83 forms an obtuse angle 108 between an interior surface of the third side 83 and an interior surface of the first side 81 and the obtuse angle 108 extends from the top end 85 of the extension enclosure 80 to the bottom end 86 of the extension enclosure 80. The first end 106 of the fourth side 84 forms an acute angle 109 between an interior surface of the fourth side 84 and an interior surface of the first side 81 and the acute angle 109 extends from the top end 85 of the extension enclosure 80 to the bottom end 86 of the extension enclosure 80. FIG. 17 shows a bottom, side perspective view of the extension enclosure 80 in a partially folded position.

To attach an extension enclosure 80 to a utility enclosure 10, the bottom end 86 of an extension enclosure 80 (a first extension enclosure) is positioned into an interior 17 of the utility enclosure 10 at the top end 15 of the utility enclosure 10. The bottom end 86 of the extension enclosure 80 engages the interior ledges 18 of the utility enclosure 10 while the external ledge 110 of the extension enclosure 80 engages the top end 15 of the utility enclosure 10. In this configuration the mounting holes 75 near the top end 15 of the utility enclosure 10 are in alignment with the mounting holes 111 at the bottom end 86 of the extension enclosure 80. A locking pin 112 is inserted into the holes 75 and 111 to attach the extension enclosure 80 to the utility enclosure 10 by methods known in the art. In a like manner, a second extension enclosure can be attached to the first extension enclosure to further increase the length of the utility enclosure. The extension enclosure 80 has the ability to fold with the utility enclosure 10 while attached to the utility enclosure 10.

Figure 18:
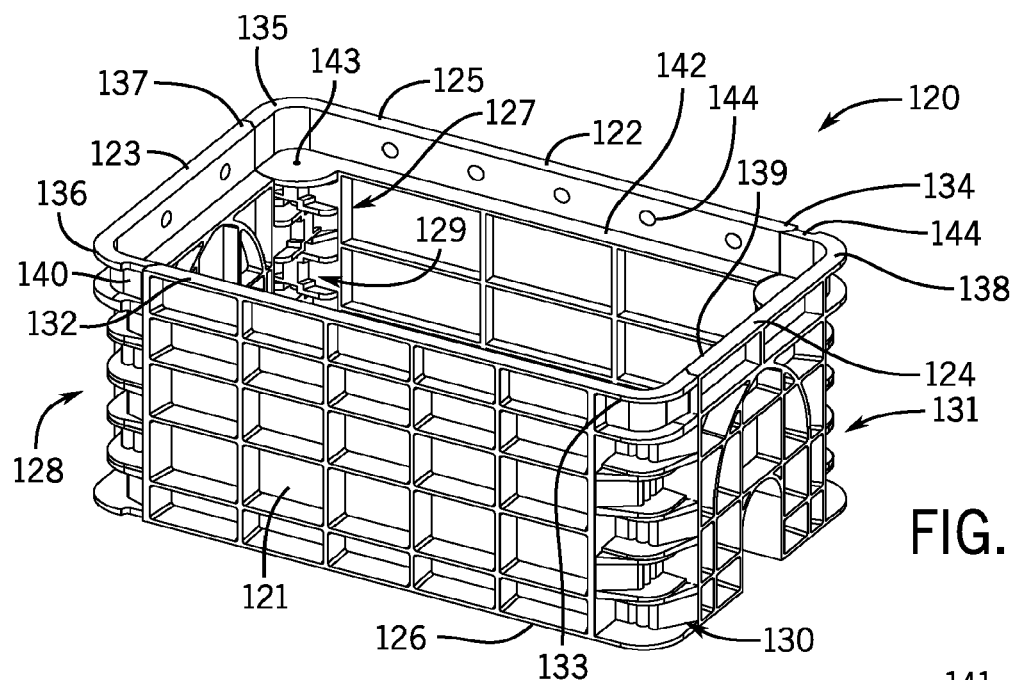
FIG. 18 is a top, front, perspective view of an alternant utility enclosure of FIG. 1 in an open position which has the features of utility enclosure of FIG. 1 plus additional features.

FIG. 18 is a top, front, perspective view of an alternant utility enclosure 120 of the present invention in an open position which has the features of utility enclosure 10 plus additional features. The utility enclosure 120 is rectangular and has a first side 121, a second side 122 opposite the first side 121, a third side 123, and a fourth side 124 opposite the third side 123. The first side 121 and the second side 122 form a first pair of sides and the third side 123 and the second side 124 form a second pair of sides. The utility enclosure 120 has a top 125, a bottom 126, and an interior 127. An interior ledge 142 is formed on each side in the interior 127 near the top 125 to support a cover (see FIG. 11) or an extension enclosure 80 (See FIG. 16). Edges of each side 121, 122, 123, and 124 are joined together with hinges 128, 129, 130, and 131 to form the rectangular utility enclosure 120, with a hinge in each corner of the rectangle.

First side 121 has a first end 132 and a second opposite end 133. The second side 122 has a first end 134 and a second opposite end 135. The third side 123 has a first end 136 and a second opposite end 137. The fourth side 124 has a first end 138 and a second opposite end 139. The first ends 136 and 138 of the sides 123 and 124 form curved corners which end with extensions 140 and 141. The second opposite end 133 of the first side 121 abuts the second opposite end 139 of the fourth side 138 and the second opposite end 137 of the third side abuts the second opposite end 135 of the second side 122.

The first end 132 of the first side 121 is connected to the first end 136 of the third side 123 by means of a first hinge 128. The second opposite end 135 of the second side 122 is connected to the second opposite 137 end of the third side 123 by means of a second hinge 129. The second opposite end 133 of the first side 121 is connected to the second opposite end 139 of the fourth side 124 by means of a third hinge 130. The first end 134 of the second side 122 is connected to the first end 138 of the fourth side 124 by means of a fourth hinge 131. Each hinge has a single hinge pin 143 that extends from a top 125 of the utility enclosure 120 to a bottom 126 of the utility enclosure 120.

The third side 123 is constructed to rotate on the first 128 and second 129 hinges only away from the first side 121 and the fourth side 124 is constructed to rotate on the third 130 and fourth 131 hinges only towards the first side 121 when the utility enclosure 120 is moved from an unfolded position to a folded position. The third side 123 and the fourth side 124 are constructed to rotate until the first side 121 engages the second side 122 and the enclosure 120 is in a folded configuration. The first end 132 of the first side 121 at the top of the utility enclosure 120 slidably overlaps the first end 136 of the third side 123 at the top of the utility enclosure 120 and the first end 134 of the second side 122 at the top of the utility enclosure 120 slidably overlaps the first end 138 of the fourth side 124 at the top of the utility enclosure 120.

FIG. 18 further shows that the sides 121 and 122 have a plurality of convex detents 144 near the top end 125 of the sides and above the interior ledges 142. The convex detents 144 are for mounting an extension enclosure 80 to the top end 125 of the utility enclosure 120 to increase the length of the utility enclosure 120 from its bottom end to its top end.

Figure 19:
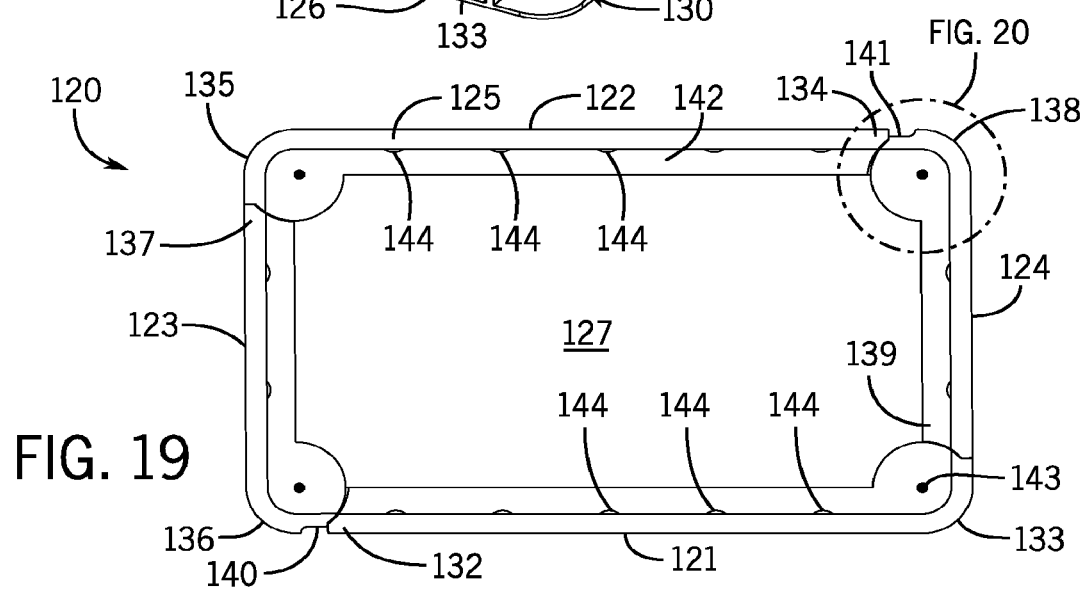
FIG. 19 shows a top plan view of the utility enclosure of FIG. 18 in an open position.

FIG. 19 shows a top view of the utility enclosure 120 in an open position. FIG. 19 further shows that the first end 136 of the third side 123 has an extension 140 and that the first end 138 of the fourth side 124 has an extension 141.

Figure 20:
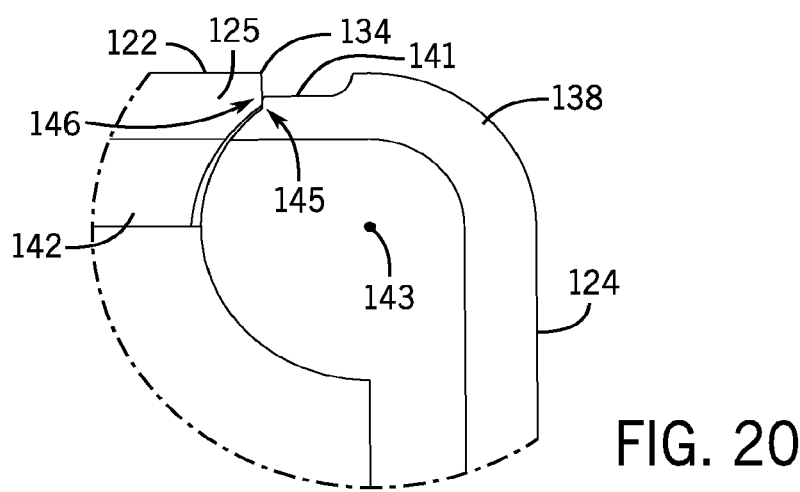
FIG. 20 is an enlarged view of the first end of the fourth side and the first end of the second side of the utility enclosure of FIG. 19.
Figure 21:
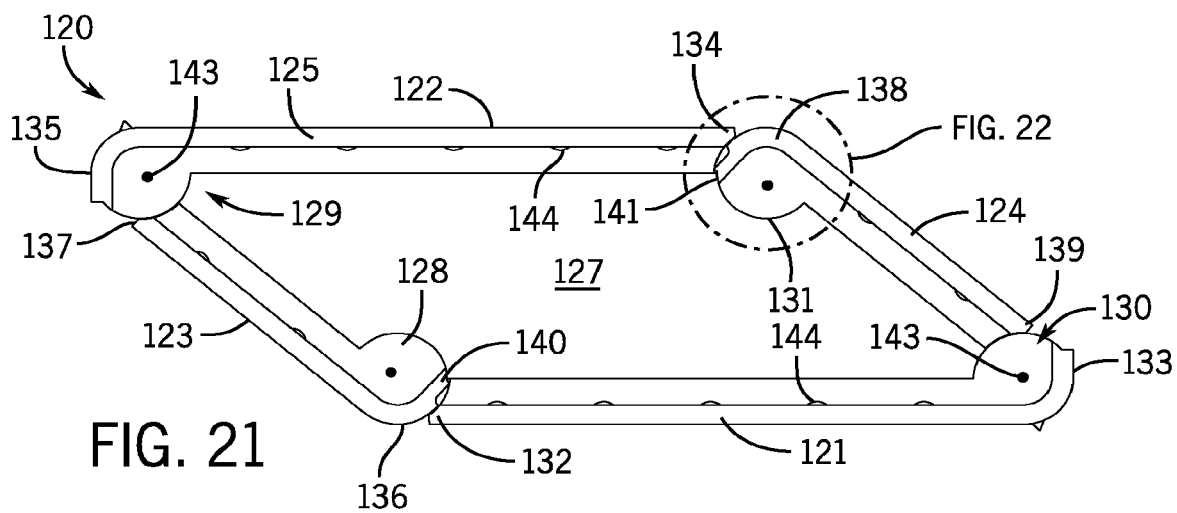
FIG. 21 shows a top view of the utility enclosure of FIG. 19 in a partially folded configuration.
Figure 22:
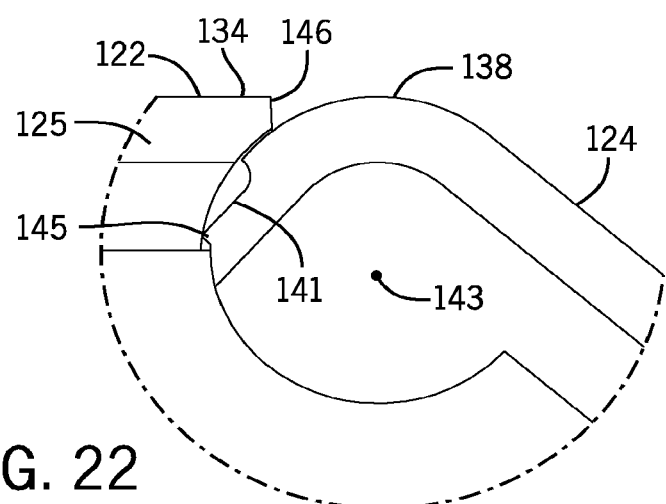
FIG. 22 shows an enlarged view of the first end of the fourth side and the first end of the second side of the utility enclosure of FIG. 21.

FIG. 20 is an enlarged view of the first end 136 of the fourth side 124 and the first end 134 of the second side 122. FIG. 20 further shows that a first detent 145 is formed on the extension 141 at the point where the extension 141 engages the first end 134 of the second side 122. A second detent 146 is formed on the first end 134 where the second detent 146 engages the first detent 145. The detents 145 and 146 have planar surfaces parallel to each other. A detent is a device that temporarily keeps one part in a certain position relative to that of another and can be released by applying force to one of the parts (www.dictionary.com). The detents 145 and 146 maintain or lock the utility enclosure 120 in an open position. If force is applied to one or the other of the detents 145 and 146 the first end 134 of second side 122 will slide over the first end 138 of fourth side 124. For example, if the second side 122 is pushed away from the interior 127 of the utility enclosure 120 or if the fourth side 124 is pushed towards the interior 127 of the utility enclosure 120, then the detents 145 and 146 will pass over each other and the enclosure 120 will fold. FIG. 21 shows the utility enclosure 120 in a partially folded configuration and FIG. 22 shows an enlarged view of the ends 134 and 138 of sides 122 and 124 in a folded condition. The use of the detents 145 and 146 allows the utility enclosure 120 to be reversibly locked in an open position without the use of the locking pin 70 shown in FIG. 14.

Figure 23:
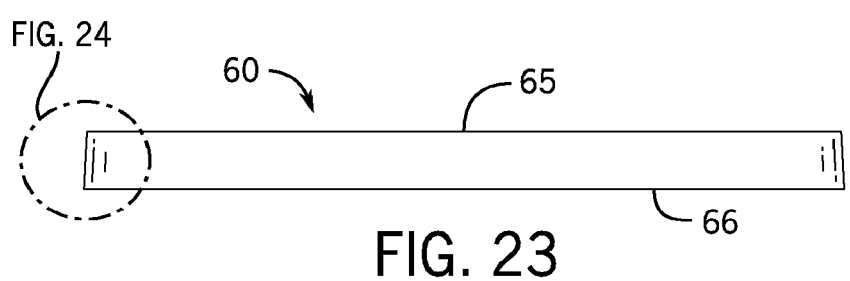
FIG. 23 shows a side view of the top cover or lid shown in FIG. 11.
Figure 24:
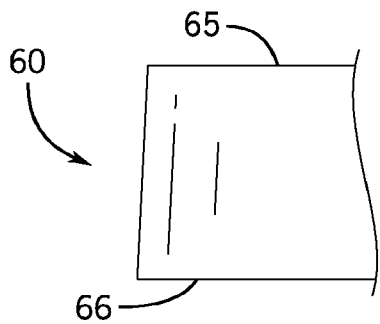
FIG. 24 shows an enlarged view of the sides of the lid shown in FIG. 24.

FIG. 23 shows a side view of the top cover or lid 60 shown in FIG. 11. The lid 60 has a top surface 65 and a bottom surface 66. An enlarged view of the end of the lid is shown in FIG. 24. The length of the bottom surface 66 of the lid 60 is greater than the length of the top surface 65. The sides of the lid are, thus, tapered slightly from the bottom surface 66 to the top surface 65. The convex detents 144 that are for mounting an extension enclosure 80 to the top end 125 of the utility enclosure 120 are also used to mount and retain the lid 60 at the top 125 of the utility enclosure 120. The lid 60 is placed on the top 125 of the utility enclosure 120 and the bottom 66 of the lid 60 is forced pass beyond the convex detents 144. The convex detents 144 will then keep the lid 60 reversibly locked on the utility enclosure 120 until a pulling force is applied to the lid 60 to remove it. The use of the convex detents 144 allows the lid 60 to be reversibly locked to the top 125 of the utility enclosure 120 without using external fasteners.

Figures 25, 26:
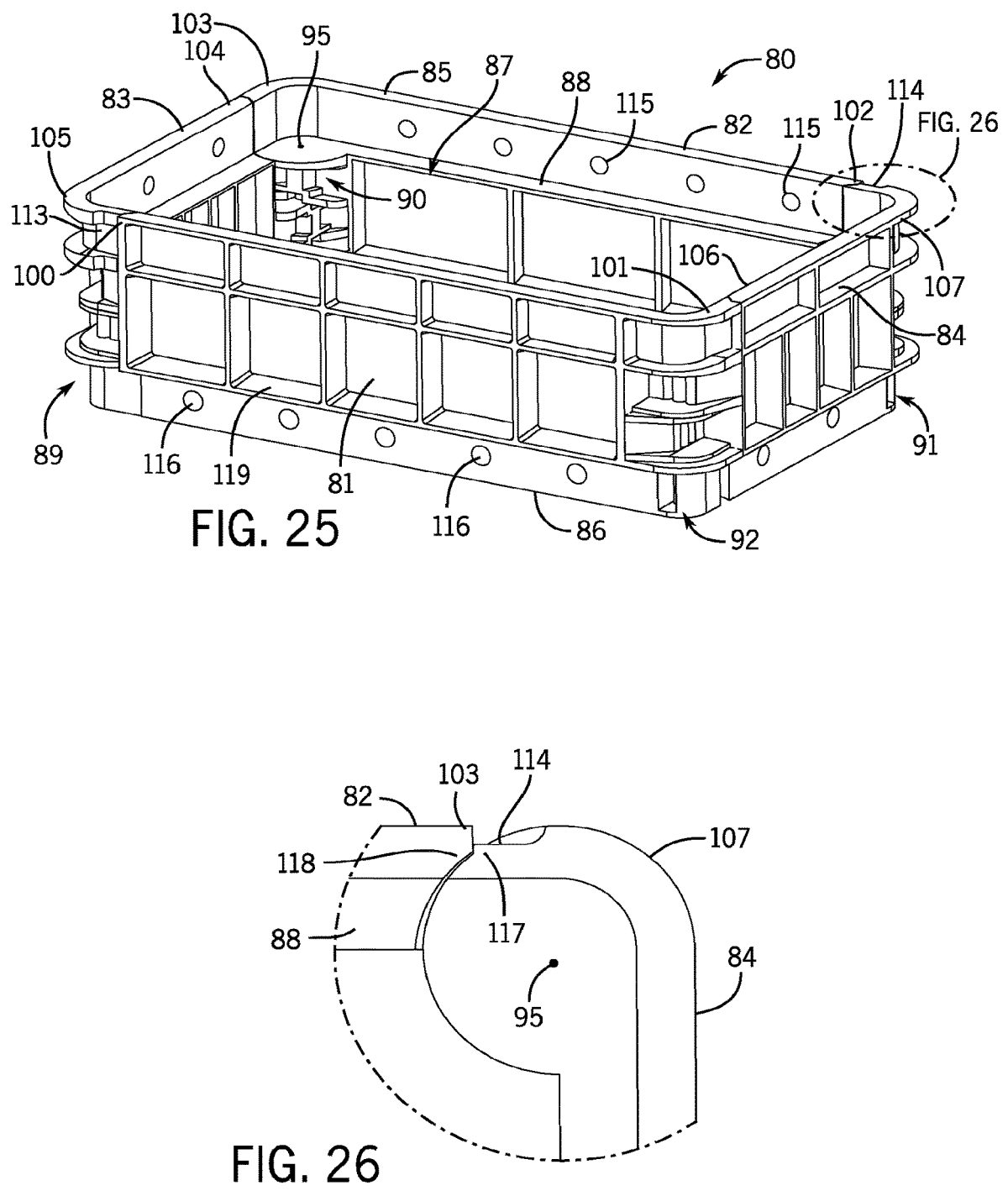

FIG. 25 shows a top, side view of the extension enclosure 80 shown in FIG. 16 in an open position and further shows that the second opposite end 105 of the third side 83 has an extension 113 and the second opposite end 107 of the fourth side 84 has an extension 114. FIG. 24 also shows the additional features of detents as described in FIGS. 18-22. The sides 81, 82, 83, and 84 have a plurality of convex detents 115 near the top end 85 of the sides and above the interior ledges 88. The convex detents 115 are for mounting another extension enclosure 80 to the top 85 of the extension enclosure 80 or for reversibly fastening a lid 60 to the top 85 of the extension enclosure 80. The extension enclosure 80 also has a plurality of concave detents 116 between the external bottom ledge 119 and the bottom 86. These concave detents will reversibly lock the extension closure 80 to the top 125 of a utility enclosure 120 by means of the convex detents 144 (see FIG. 18) or to the top 85 of another extension enclosure 80 by means of the convex detents 115.

FIG. 26 is an enlarged view of the second end 107 of the fourth side 84 and the first end 102 of the second side 82. FIG. 25 further shows that a first detent 117 is formed on the extension 114 at the point where the extension 114 engages the first end 102 of the second side 82. A second detent 118 is formed on the first end 102 where the second detent 118 engages the first detent 117. The detents 117 and 118 have planar surfaces parallel to each other and function similar to the detents 145 and 146 of the utility enclosure 122. The use of the detents 117 and 118 allow the extension enclosure 80 to be reversibly locked in an open position without the use of the locking pin 70 shown in FIG. 14.

The foregoing description illustrates and describes the disclosure. Additionally, the disclosure shows and describes only the preferred embodiments but, it is to be understood that the preferred embodiments are capable of being formed in various other combinations, modifications, and environments and are capable of changes or modifications within the scope of the invention concepts as expressed herein, commensurate with the above teachings and/or the skill or knowledge of the relevant art. The embodiments described herein above are further intended to explain the best modes known by applicant and to enable others skilled in the art to utilize the disclosure in such, or other, embodiments and with the various modifications required by the particular applications or uses thereof. Accordingly, the description is not intended to limit the invention to the form disclosed herein. Also, it is intended that the appended claims be construed to include alternative embodiments. It will be further understood that various changes in the details, materials, and arrangements of the parts which have been described and illustrated above in order to explain the nature of this invention may be made by those skilled in the art without departing from the principle and scope of the invention as recited in the following claims.

We claim:

1. A foldable enclosure comprising:
 a first side, a second side opposite the first side, a third side, and a fourth side opposite the third side, each of said sides having a first end and a second opposite end, the first end of the first side connected to the first end of the third side; the second opposite end of the second side connected to the second opposite end of the third side; the second opposite end of the first side connected to the second opposite end of the fourth side; and the first end of the second side connected to the first end of the fourth side,
 a first detent on at least one of the first end of the first side, the first end of the second side, the first end of the third side, or the first end of the fourth side,
 a plurality of side detents disposed on an interior surface of the foldable enclosure, wherein the third side rotates only away from the first side and the fourth side rotates only towards the first side when the foldable enclosure is moved from an unfolded position to the folded position, and
 wherein the first detent reversibly maintains the foldable utility enclosure in the unfolded position.

2. The foldable enclosure of claim 1, wherein the plurality of side detents are disposed near a top of the foldable enclosure.

3. The foldable enclosure of claim 1, further comprising an interior ledge provided on at least one of the first side, the second side, the third side, or the fourth side, and wherein the plurality of side detents are disposed between the interior ledge and a top of the foldable enclosure.

4. The foldable enclosure of claim 1, wherein the plurality of side detents are convex detents.

5. The foldable enclosure of claim 1, wherein the first end of the third side at a top of the foldable enclosure overlaps the first end of the first side at the top of the foldable enclosure and the first end of the fourth side at the top of the foldable enclosure overlaps the first end of the second side at the top of the foldable enclosure when the foldable enclosure is in a folded position.

6. The foldable enclosure of claim 1, wherein the third side and the fourth side are rotatable until the first side engages the second side in the folded position.

7. The foldable enclosure of claim 1, wherein the first end of the first side is connected to the first end of the third side by means of a first hinge; the second opposite end of the second side is connected to the second opposite end of the third side by means of a second hinge; the second opposite end of the first side is connected to the second opposite end of the fourth side by means of a third hinge; and the first end of the second side is connected to the first end of the fourth side by means of a fourth hinge.

8. The foldable enclosure of claim 6, wherein at least one of the first hinge, second hinge, third hinge, or fourth hinge includes a single hinge pin.

9. The foldable enclosure of claim 6, wherein at least one of the first hinge, second hinge, third hinge, or fourth hinge includes a locking pin.

10. The foldable enclosure of claim 1, wherein the foldable enclosure is formed from a composite material.

11. A foldable enclosure comprising:
a first side, a second side opposite the first side, a third side, and a fourth side opposite the third side, each of said sides having a first end and a second opposite end, the first end of the first side connected to the first end of the third side; the second opposite end of the second side connected to the second opposite end of the third side; the second opposite end of the first side connected to the second opposite end of the fourth side; and the first end of the second side connected to the first end of the fourth side,
an interior ledge provided on at least one of the first side, the second side, the third side, or the fourth side; and
a plurality of detents disposed on an interior surface of the foldable enclosure between the interior ledge and a top of the foldable enclosure,
wherein the third side rotates only away from the first side and the fourth side rotates only towards the first side when the foldable enclosure is moved from an unfolded position to the folded position.

12. The foldable enclosure of claim 11, wherein the plurality of detents are convex detents.

13. The foldable enclosure of claim 11, further comprising a detent on at least one of the first end of the first side, the first end of the second side, the first end of the third side, or the first end of the fourth side, wherein the detent reversibly maintains the foldable utility enclosure in the unfolded position.

14. The foldable enclosure of claim 11, wherein the first end of the third side at a top of the foldable enclosure overlaps the first end of the first side at the top of the foldable enclosure and the first end of the fourth side at the top of the foldable enclosure overlaps the first end of the second side at the top of the foldable enclosure when the foldable enclosure is in a folded position.

15. The foldable enclosure of claim 11, wherein the third side and the fourth side are rotatable until the first side engages the second side in the folded position.

16. The foldable enclosure of claim 11, wherein the first end of the first side is connected to the first end of the third side by means of a first hinge; the second opposite end of the second side is connected to the second opposite end of the third side by means of a second hinge; the second opposite end of the first side is connected to the second opposite end of the fourth side by means of a third hinge; and the first end of the second side is connected to the first end of the fourth side by means of a fourth hinge.

17. The foldable enclosure of claim 16, wherein at least one of the first hinge, second hinge, third hinge, or fourth hinge includes a single hinge pin.

18. The foldable enclosure of claim 16, wherein at least one of the first hinge, second hinge, third hinge, or fourth hinge includes a locking pin.

19. The foldable enclosure of claim 11, wherein the foldable enclosure is formed from a composite material.

* * * * *